(12) United States Patent
Guyot et al.

(10) Patent No.: US 6,463,293 B1
(45) Date of Patent: Oct. 8, 2002

(54) METHOD FOR PREPARING A TERMINAL TO BE USED IN A SYSTEM, AND SYSTEM AND TERMINAL

(75) Inventors: Gilbert Guyot, Mutzig (FR); Patrice Mignot, Strasbourg (FR); Jean-Yves Dumaine, Strasbourg (FR); Hubert Rinie, Gries (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/536,976

(22) Filed: Mar. 28, 2000

Related U.S. Application Data

(63) Continuation-in-part of application No. 09/160,749, filed on Sep. 25, 1998, now Pat. No. 6,067,351.

(51) Int. Cl.⁷ .................................................. H04B 7/20
(52) U.S. Cl. ....................... 455/466; 455/558; 455/560; 455/422
(58) Field of Search ................................ 455/560, 466, 455/558, 414, 411, 433, 561, 422, 445

(56) References Cited

U.S. PATENT DOCUMENTS

| | | | |
|---|---|---|---|
| 4,713,780 A | | 12/1987 | Schultz et al. |
| 4,837,798 A | | 6/1989 | Cohen et al. |
| 5,307,411 A | | 4/1994 | Anvret et al. |
| 5,548,789 A | | 8/1996 | Nakanura |
| 5,635,918 A | * | 6/1997 | Tett ........................ 340/825.52 |
| 5,757,891 A | | 5/1998 | Wang |
| 5,905,777 A | * | 5/1999 | Foladare et al. .......... 379/90.01 |
| 5,933,773 A | * | 8/1999 | Barvesten ................... 455/411 |
| 6,085,099 A | * | 7/2000 | Ritter et al. ................ 455/466 |
| 6,192,255 B1 | * | 2/2001 | Lewis et al. ................ 455/558 |
| 6,292,668 B1 | * | 9/2001 | Alanara et al. ............. 455/466 |
| 6,292,669 B1 | * | 9/2001 | Meuronen et al. .......... 455/466 |
| 6,366,771 B1 | * | 4/2002 | Angle et al. ................ 455/414 |

FOREIGN PATENT DOCUMENTS

| | | |
|---|---|---|
| DE | 3234081 | 3/1984 |
| EP | 0739115 | 10/1996 |
| EP | 0782304 | 7/1997 |
| FR | 2737797 | 2/1997 |
| JP | 4178058 | 6/1992 |
| JP | 8097852 | 4/1996 |
| WO | 9406230 | 3/1994 |
| WO | 9520793 | 8/1995 |
| WO | 9522865 | 8/1995 |
| WO | 9620553 | 7/1996 |
| WO | 9708906 | 3/1997 |
| WO | 9733413 | 9/1997 |

OTHER PUBLICATIONS

"Accessing Messages Your Way," article by AT&T, 10(1995) Spring, No. 1.
"Electronic Mail mit Pager," by Forschung & Entwicklung, 68(1996) Feb., No. 4.
"AT&T Mail Public Messaging Service," article by J. Defelice and R. Henry of AT&T, 4(1989) No. 2.
European Patent Office Search Report dated Apr. 16, 1998.

\* cited by examiner

*Primary Examiner*—Daniel Hunter
*Assistant Examiner*—Lana Le
(74) *Attorney, Agent, or Firm*—Ware, Fressola, Van Der Sluys & Adolphson LLP

(57) ABSTRACT

Terminals having analog/digital telephone functions as well as data exchange functions are typically used by users who have a lower skill level than the average user of a personal computer. Therefore, such a terminal should be as self-supporting and independent as possible, which could be realized by selecting and storing addresses of access providers and/or server providers in a non-mechanical terminal memory, which could further comprise software for performing protocols. Then the terminal is almost completely ready for use, with complex and time-consuming installment by a user no longer being necessary.

16 Claims, 3 Drawing Sheets

METHOD FOR PREPARING A TERMINAL TO BE USED IN A SYSTEM, AND SYSTEM AND TERMINAL

CROSS-REFERENCE TO RELATED APPLICATIONS

This is a Continuation-In-Part application of a application Ser. No. 09/160,749 filed Sep. 25, 1998, now U.S. Pat. No. 6,067,351, which discloses subject matter which is disclosed and may be claimed in copending U.S. patent applications having Ser. Nos. 09/160,658, 09/160,871, 09/160,959 and 09/161,110, all filed on Sep. 25, 1998.

TECHNICAL FIELD

The invention relates to a method for preparing a terminal to be used in a system for exchanging data between said terminal and access means via a communication network, which terminal comprises: a terminal-interface to be coupled to the telecommunication network, a processor coupled to the terminal-interface, and a terminal-memory coupled to the processor, wherein the access means comprise: at least one access point to be coupled to the telecommunication network and at least one server to be coupled to the access point via a data connection

BACKGROUND OF THE INVENTION

Such a method, with the terminal, for example, being a personal computer and with the access means being formed by an access provider and a service provider, and with the telecommunication network being, for example, an analog or an ISDN network, is of common general knowledge. The terminal-interface comprises, for example, a modem card or an ISDN board, and the terminal-memory comprises, for example, a hard disk drive and/or a floppy disk drive. Before being able to use the system, for example for exchanging e-mail messages via INTERNET, a user must install software by inserting a floppy disk into a drive and typing commands.

In a different method, with the terminal for example being a mobile (e.g., Global System for Mobile Communication (GSM), Universal Mobile Telecommunication System (UMTS), or Cordless Telephony System (CTS) terminal) or a wireless (e.g., Digital European Cordless Telecommunication (DECT) terminal, the terminal-interface is, for example, a GSM interface, a UMTS interface, a CTS interface, a DECT interface or a radio-interface coupled to a radio link.

The above-described methods are disadvantageous, inter alia, because of requiring a certain skilled level and an amount of time from the user before the system can be used, whereby the occurrence of failures cannot be excluded, which further delay a possible use of the system.

SUMMARY OF THE INVENTION

It is an object of the invention, inter alia, to provide a method as defined in the preamble, which excludes the occurrence of failures during an installment requiring a minimum skill level and a minimum amount of time from the user.

The method according to the invention is characterized in that the method comprises the steps of: selecting at least one access code out of many access codes defining addresses of access points, and storing at least one selected access code into the terminal-memory, which is a non-mechanical memory.

By selecting at least one access code defining an address of an access point, such as a telephone number of an access provider, and storing this access code into the non-mechanical terminal-memory, together with software for performing protocols (which software has been stored before or is stored at the same time), the terminal is almost completely ready for use, with a complex and time-consuming installment by a user no longer being necessary. In particular, when the terminal is in the form of a telephone comprising a display and two keyboards, the average user will be of lower skill level than the average user of a personal computer, in which case the method according to the invention is even more advantageous.

The invention is based on the insight, inter alia, that present non-mechanical terminal-memories may comprise all codes defining destinations, all software for performing protocols and all further commands, to allow a terminal being as much self-supporting and independent as possible.

The invention solves the problem, inter alia, of providing a method for preparing a terminal to be used in a system for exchanging data between the terminal and access means via a telecommunication network, by not just storing regular software for performing protocols but also selecting and storing access codes defining addresses of access points, which strongly reduces the number of actions to be performed by a user.

A first embodiment of the method according to the invention is characterized in that the method comprises the steps of: selecting at least one server code out of many server codes defining addresses of servers, and storing at least one selected server code into the non-mechanical terminal-memory.

By selecting at least one server code defining an address of a server, such as a number of a server provider, and storing this server code into the non-mechanical terminal-memory, the terminal is completely ready for use, apart from a start command, which could be generated via one of the keyboards by typing a command or pressing a button.

A second embodiment of the method according to the invention is characterized in that the non-mechanical terminal-memory comprises a card reader and a card.

In this case a user could shift the card comprising access codes and/or server codes into the card reader, after which either the codes are transported to a further part of the non-mechanical memory, such as a Read Only Memory (ROM) or a Random Access Memory (RAM), or not. The software for performing protocols could then either be stored in the further part, or even on the card, if possible.

The invention further relates to a system for exchanging data between a terminal and access means via a telecommunications network, which terminal comprises: a radio-interface to be coupled to the telecommunication network via a radio link, a processor coupled to the radio-interface, and a terminal-memory coupled to the processor, wherein the access means comprise at least one access point to be coupled to the telecommunication network, and at least one server to be coupled to the access point via a data connection.

The system according to the invention is characterized in that the terminal-memory is a non-mechanical memory comprising at least one access code which has been selected out of many access codes defining addresses of access points.

A first embodiment of the system according to the invention is characterized in that the non-mechanical terminal-memory comprises at least one server code which has been selected out of many server codes defining addresses of servers.

A second embodiment of the system according to the invention is characterized in that the non-mechanical terminal-memory comprises a card reader and a card.

A third embodiment of the system according to the invention is characterized in that the system comprises generation means for generating a challenge signal, with the card comprising a key signal and calculation means for calculating a response signal in response to the challenge signal, and with the access means comprising judging means for judging the calculated response signal.

By providing either the terminal or the access means with the generation means and by providing the card with the key signal and the calculation means and by providing the access means with the judging means, an authentication procedure becomes possible, whereby all confidential processes either take place inside the smart card or inside the access means, with the terminal (excluding the smart card) being authentication-independent.

A fourth embodiment of the system according to the invention is characterized in that the card comprises receiving means for receiving a PIN (Personal Identification Number) signal and for, in case of the PIN signal being correct or not, activating or deactivating the calculation means.

The PIN signal, which for example could be generated by a user by using at least one of the keyboards, prevents an unauthorized user using the smart card.

The invention yet further relates to a terminal for exchanging data with access means via a telecommunication network, which terminal comprises:

a radio-interface to be coupled to the telecommunication network via a radio link,
 a processor coupled to the radio-interface, and
 a terminal-memory coupled to the processor,
which access means comprise
 at least one access point to be coupled to the telecommunication network, and
 at least one server to be coupled to the access point via a data connection.

The terminal according to the invention is characterized in that the terminal-memory is a non-mechanical memory comprising at least one access code which has been selected out of many access codes defining addresses of access points.

A first embodiment of the terminal according to the invention is characterized in that the non-mechanical terminal-memory comprises at least one server code which has been selected out of many server codes defining addresses of servers.

A second embodiment of the terminal according to the invention is characterized in that the non-mechanical terminal-memory comprises a card reader and a card.

A third embodiment of the terminal according to the invention is characterized in that the card comprises a key signal and calculation means for calculating a response signal in response to a challenge signal.

A fourth embodiment of the terminal according to the invention is characterized in that the card comprises receiving means for receiving a PIN signal and for, in the case of the PIN signal being correct or not, activating or deactivating the calculation means.

All references including further references cited with respect to and/or inside the references are considered to be incorporated in this patent application.

BRIEF DESCRIPTION OF THE DRAWINGS

The invention will be explained in greater detail at the hand of embodiments disclosed in the drawings, whereby.

BEST MODE FOR CARRYING OUT THE INVENTION

Figure 1:
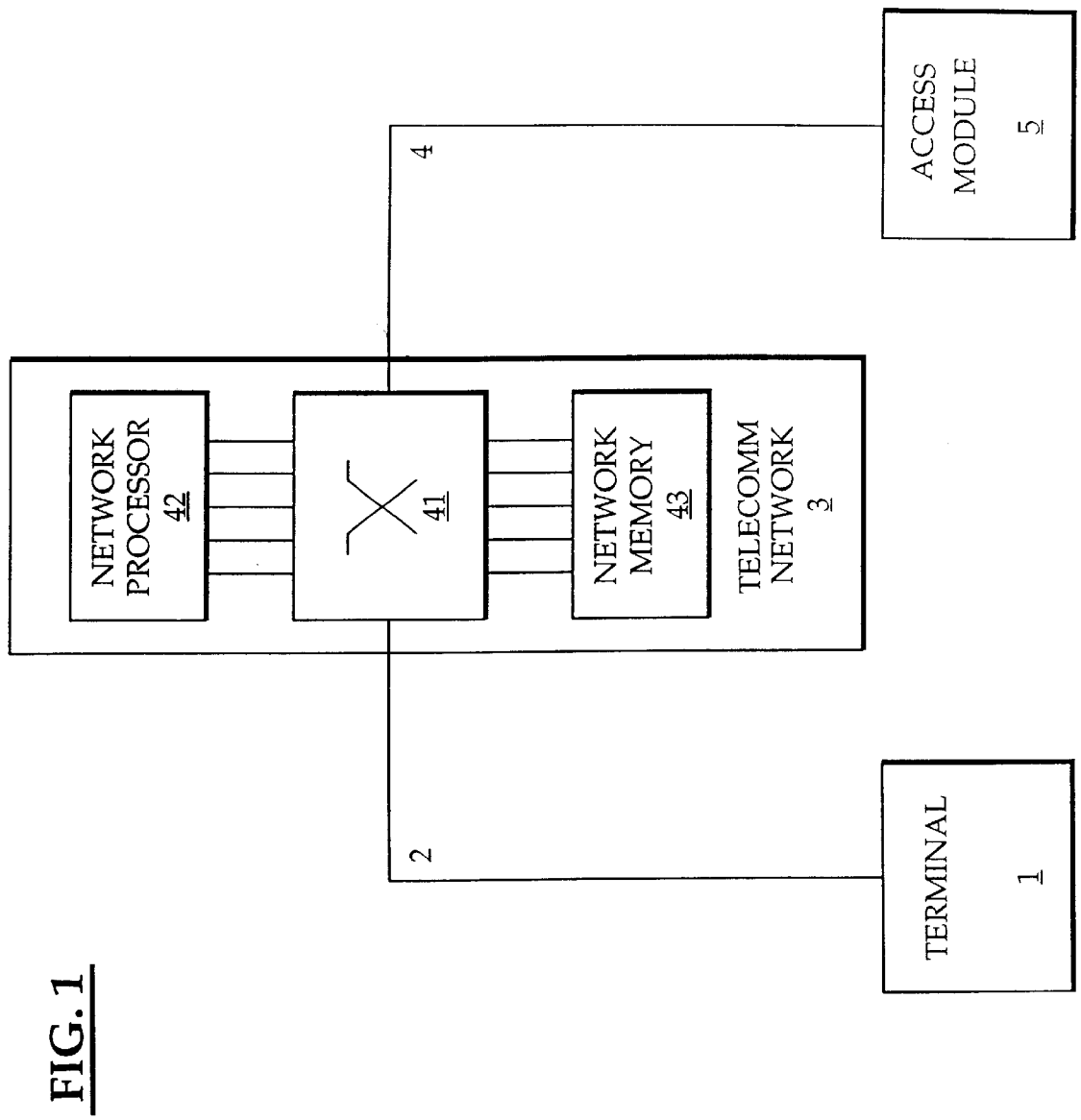
FIG. 1 discloses a system according to the invention comprising a terminal according to the invention and access means according to the invention.

The system according to the invention as disclosed in FIG. 1 comprises a terminal 1 according to the invention coupled via a communication link 2 to a telecommunication network 3 and comprises access means 5 according to the invention coupled via a communication link 4 to the telecommunication network 3. The telecommunication network 3 comprises a switch 41 controlled by a network-processor 42 and coupled to a network-memory 43.

Figure 2:
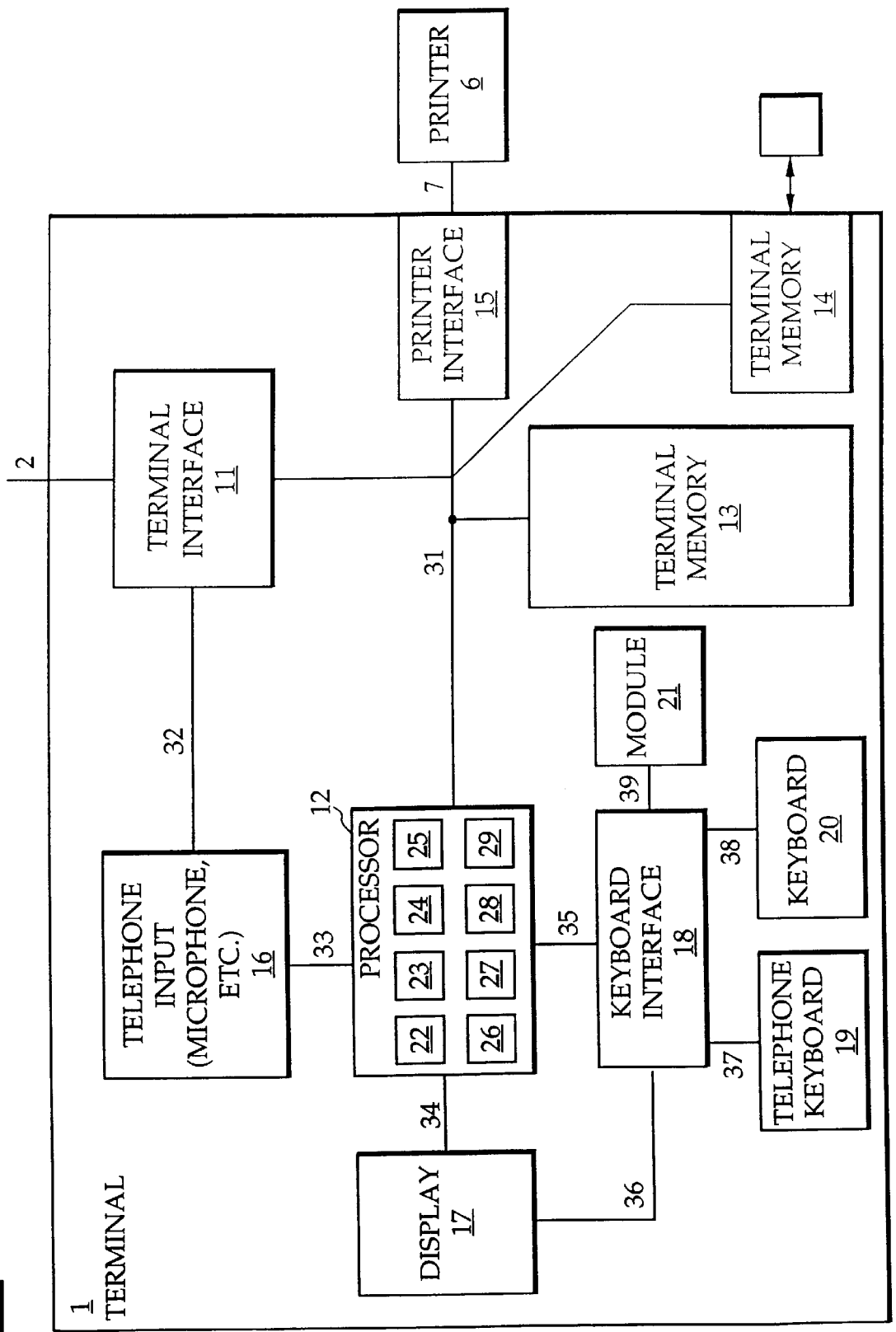
FIG. 2 discloses a terminal according to the invention for exchanging data with access means.

The terminal 1 according to the invention as disclosed in FIG. 2 comprises a terminal-interface 11 coupled to the communication link 2 and coupled via a bus 31 to a processor 12 and to terminal-memories 13 and 14 and to a printer-interface 15 and coupled via a connection 32 to telephone means 16 (microphone, speaker, etc.). A processor 12 is further coupled via a connection 33 to telephone means 16 and via a connection 34 to a display 17 and via a connection 35 to a keyboard-interface 18, which via a connection 36 is coupled to display 17 and via a connection 37 to a telephone-keyboard 19 and via a connection 38 to an alphanumeric-keyboard 20 and via a connection 39 to a module 21. Printer-interface 15 is coupled via a connection 7 to a printer 6. In case of the printer 6 being connected to the printer-interface 15 via the connection 7 in the form of a wired link, the terminal 1 comprises a printer connector between the printer-interface 15 and the wired connection 7. In the case of the printer 6 being connected to the printer-interface 15 via the connection 7 in the form of a wireless coupling (e.g., an infrared coupling or a radio coupling), the terminal 1 comprises a printer coupler between the printer-interface 15 and the wireless connection 7.

Figure 3:
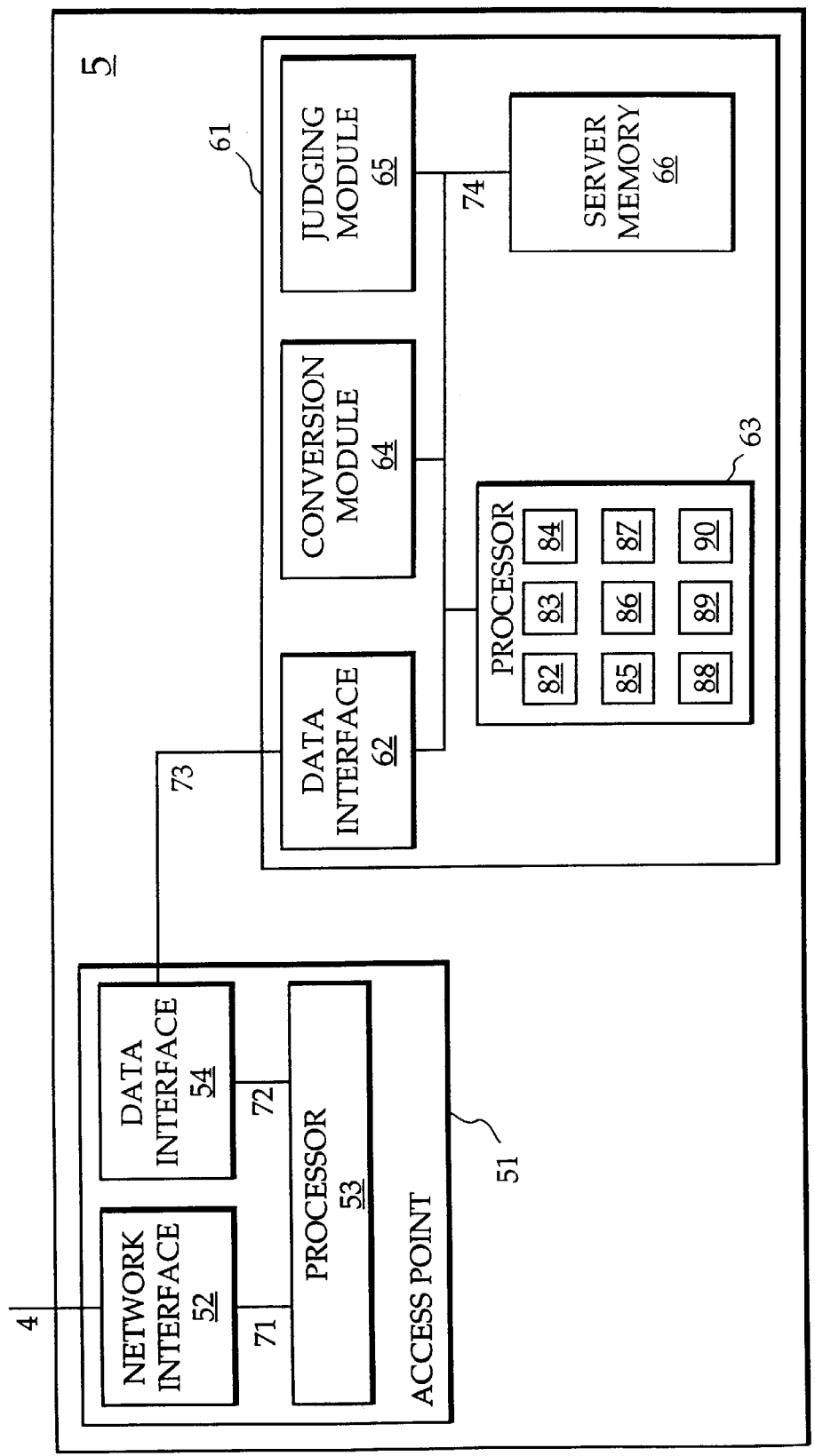
FIG. 3 discloses access means according to the invention for exchanging data with a terminal.

Access means 5 as disclosed in FIG. 3 comprise an access point 51 being provided with a network-interface 52 coupled via a communication link 4 to a telecommunication network 3 and with a processor 53 coupled via connection 71 to a network-interface 52 and via a connection 72 to a data-interface 54, which is coupled to a data-connection 73. Access means 5 further comprise a server 61 being provided with a data-interface 62 coupled to a data-connection 73 and via a bus 74 to a processor 63 and to conversion means 64 and to judging means 65 and to a server-memory 66.

The system disclosed in FIG. 1 comprising the terminal 1 disclosed in FIG. 2 and the access means 5 disclosed in FIG. 3 functions as follows:

Generally, before it can be used for all purposes, terminal 1 will have to be provided with installation-data. This can be done according to at least three possibilities.

According to a first possibility, the user dials a predefined telephone number via telephone-keyboard 19, which telephone number is transmitted via connection 37, keyboard-interface 18, connection 35, a processor 12, a bus 31, terminal-interface 11 and a communication link 2 to a telecommunication network 3 as Dual Tone Multi Frequency (DTMF) signals in case terminal 1 is an analog terminal and as digital signals in case terminal 1 is an Integrated Service Digital Network (ISDN) terminal (whereby a mixture of both kind of signals should not be excluded, such as, for example, the possibility of post dialing in DTMF on an ISDN terminal). In case of terminal 1 being a wired analog or digital (ISDN) terminal, the terminal-interface 11 is coupled to the telecommunication network 3 via a wired communication link 2 such as a telephone line. In case of terminal 1 being a mobile (e.g., GSM, UMTS or CTS) terminal or a wireless (e.g., DECT) terminal, the terminal-interface 11 is coupled to the telephone or communication network 3 via a radio link.

In response to this, telecommunication network 3 connects the communication link 2 to a communication link 4 under control of the network-processor 42, and in access point 51 the communication link 4 is coupled via network-interface 52 and a processor 53 and data-interface 54 to a data-connection 73, which in the server 61 is coupled via data-interface 62 and a bus 74 to server-memory 66, which, under the control of the processor 63, sends installation-data to the terminal 1 (automatically or in response to an installation-command originating from the terminal 1). This installation-data comprises, for example, at least one access code defining an address of an access point and at least one server code defining an address of a server address and software and/or commands. This installation-data is stored into terminal-memory 13 or terminal-memory 14 or spread over both terminal-memories 13 and 14. As an alternative, it is also possible that a communication link 2 is connected to other access means comprising at least either another access point not shown in the drawing figures or another server not shown in the drawing figures, or that the communication link 2 is only connected to network-memory 43 for the receival of the installation-data.

According to a second possibility, at least some of the installation-data is not transmitted from the server 61 to the terminal 1, but is supplied to the terminal 1 by the user via the use of alphanumeric-keyboard 20.

According to a third possibility, at least some of the installation-data is neither transmitted from the server 61 to the terminal 1 nor supplied to the terminal 1 by the user via the user of an alphanumeric-keyboard 20, but is supplied to the terminal 1 by the user via the insertion of a smart card into terminal-memory 14 being a card reader.

Of course, parts of the three possibilities could be combined, whereby, for example, the insertion of the smart card could trigger and thus replace the dialing of the telephone number. Instead of loading the installation-data into the terminal 1, at least some or all installation-data could already be stored in terminal-memories 13 and 14, which could have been realized during manufacturing.

In case the installation-data to be stored into or already stored in the terminal 1 is user-dependent, for example, due to the fact that a user should be able to choose his favorite access point and server, when using the first possibility different telephone numbers could be used, or in case of one telephone number, different installation-commands could be used, and when using the second possibility the smart card should be individualized. Due to this, generally a selection of at least one access code and/or at least one server code has to be made (during manufacturing or during selling by giving the user a certain smart card and/or certain instructions or during installation by the user), after which selected access codes and server codes should be stored into at least one of the terminal-memories 13 (ROM, RAM, etc.) and 14 (card reader), which preferably are non-mechanical due to the terminal 1 having a predefined size and price.

The storage of the installation-data including, for example, at least one access code defining an address of an access point and at least one server code defining an address of a server address and software and/or commands in a very user friendly way allows the terminal 1 also to be used by users who are of a lower skill level than, for example, the average user of a personal computer. After the storage, for example, only one command or even a certain key of one of the keyboards 19 and 20 could be sufficient for getting access to, for example, INTERNET for sending data such as e-mail messages and/or taking a look at received data such as e-mail messages which are stored in server-memory 66.

The use of a smart card further offers the possibility of storing a key signal and calculations means on the smart card. These calculation means calculate a response signal in response to a challenge signal and the key signal, after which the response signal is transmitted to judging means 65 inside the server 61 via a bus 31, terminal-interface 11, a communication link 2, a telecommunication network 3, a communication link 4, an access point 51, data-connection 73, data-interface 62 and a bus 74. Judging means 65 judge whether or not the calculated response signal originating from the smart card is correct, for example, by making the same calculation and comparing the results. The generation of the challenge signal could be realized by the processor 63 comprising generation means 82, after which the challenge signal should be sent to the terminal 1, or could be realized by the processor 12 comprising generation means 22, after which the challenge, together with or separated from the calculated response, should be sent to the server 61. The smart card could further be provided with receiving means for receiving a PIN code, whereby only in case the PIN code is correct the calculation means are to be activated. Then the unauthorized use of a smart card and of a terminal comprising the smart card is made impossible. Generally, the use of a smart card allows the storage of personal information on the card, whereby general information is stored into the terminal, as a consequence of which only after insertion of the smart card the terminal is individualized. Of course, the receiving means for receiving a PIN code could also be located inside the terminal 1, and/or could be used for blocking/allowing each possible terminal function and/or each possible access to the access means 5. The smart card could further have more functions like payment functions and/or GSM functions, and could, for example, be used for encrypting/decrypting certain data to be exchanged, for example by using the key signal, in which case access means 5 should be provided with an encryption/decryption device.

The system disclosed in FIG. 1 is capable of treating each user individually, which can be done in different ways.

According to a first way, a user of terminal 1 can get his own screen layout on the display 17, due to the fact that access means 5 have been provided with processing means for processing data destined for the terminal 1 in a user-dependent way, such as a processor 63, which comprises receiving means 83 for receiving a user-dependent code from the terminal 1 and comprises a configuration memory 84 for storing configuration parameters defining the screen layout. When a user of the terminal 1 has contacted access means 5 for receiving data, his identification and/or address are known to access means 5, for example, because he has generated his identification and/or address via at least one of the keyboards 19 and 20, or, for example, because his identification and/or address are stored on the smart card and automatically (possibly after receival of a correct PIN code) read out when the smart card is inserted, or, for example, because of the telephone number of terminal 1 being known to the telecommunication network 3 and being automatically supplied to access means 5 in case of a connection being created. This identification and/or address are received by receiving means 83, and in response to that, configuration memory 84 is read out, resulting in configuration parameters belonging to this user being used for configuring data such that he gets his own screen layout. Instead of the identification and/or address, it is also possible to use a special code generated by the user via at least one of the keyboards 19 and 20 and/or stored on the smart card.

According to a second way, when a user of terminal 1 has contacted access means 5 for receiving data like e-mail messages, it could be interesting for the user to receive only a part of the data, such as the title and the sender's address of each e-mail message, for getting an overview, and/or it could be necessary to transmit only a part of the data to the terminal 1, due to terminal-memory 13 being too small to comprise the entire content of the data. This is realized by either using the identification and/or address and/or special code, at least one of them indicating that data destined for the terminal should be transmitted in parts, and possibly indicating which part is to be transmitted. For receiving a further part, either the user should generate and transmit a further code to be received by the receiving means 83, or the further code is generated automatically, for example, after a time-interval has expired, either in the terminal 1 or in access means 5. In case the further code is generated by the user, it could be a short command, or a key of one of the keyboards 19 and 20. Of course, it should not be excluded that, for example, the special code is stored (temporarily) in server-memory 66, for example, resulting in the terminal 1 automatically receiving only a predefined part of the data.

The system disclosed in FIG. 1 can initiate actions, because of being provided with a self-triggering mechanism. This self-triggering mechanism is either in the terminal 1 or in access means 5.

In case of the self-triggering mechanism 85 being located in access means 5, it forms part of the processor 63, and functions as follows:

When there is no connection between the terminal 1 and access means 5, and, for example, server 61 receives new information to be stored in server-memory 66, such as a new weather forecast, then either a comparator forming part of the self-triggering mechanism 85 compares a code belonging to the new information with a code belonging to the terminal 1 and, for example, stored in the server-memory 66, and in case of equality decides that the terminal 1 should be informed, or a clock forming part of the self-triggering mechanism 85 decides at a certain moment, possibly after consultation of the code belonging to the terminal 1 and stored in server-memory 66, that terminal 1 should be informed. In both cases, an indication signal is generated by generation means 86 forming part of the processor 63, which generation signal comprises, for example, an address or telephone number of the terminal 1. This indication signal is supplied to the telecommunication network 3 via a bus 74, data-interface 62, data-connection 73, an access point 51 and a communication link 4. The telecommunication network 3 then transmits this indication signal to the terminal 1, in case of the terminal 1 being an analog terminal via calling line identification (after a first ringing signal of a telephone call, but before a possible second ringing signal), and in case of the terminal 1 being an ISDN terminal, via the D-channel. The terminal 1 comprises receiving means 23 forming part of the processor 12, which receiving means 23 receive (a part of) the indication signal via a communication link 2, terminal-interface 11 and a bus 31, after which the indication signal is displayed via a display 17, thereby informing the user of the arrival in the server of new information. Of course, the terminal 1 could further be provided with an automatic-connection mechanism which, in response to the receival of the indication signal, automatically makes a data connection for receiving the new information, which is then stored into terminal-memory 13.

When there is a connection between the terminal 1 and access means 5, for example, via generation means 24 which form part of the processor 12, the terminal 1 sends an update code to access means 5, whereby in the server 61 a comparator forming part of the self-triggering mechanism 85 compares this update code with codes stored in server-memory 66, and, for example, in case of inequality, the server 61 decides that the terminal 1 should get an update of software, or in the server 61 a clock forming part of the self-triggering mechanism 85 decides at a certain moment, possibly after consultation of the update code belonging to the terminal 1, that the terminal 1 should get an update of software. In both cases, the update of software as, for example, stored in server-memory 66 is transmitted to the terminal 1 together with an update signal informing terminal 1 what to do with the update (for example, to inform which old part is to be replaced).

In case of the self-triggering mechanism 25 being located in the terminal 1, it, for example, forms part of the processor 12, and functions as follows:

When there is a connection between the terminal 1 and access means 5, for example, via generation means 87 which form part of the processor 63, the server 61 sends an update code to the terminal 1, whereby in the terminal 1 a comparator forming part of the self-triggering mechanism 25 compares this update code with codes stored in terminal-memory 13, and, for example, in case of inequality, the terminal 1 decides that it should get an update of software, or in the terminal 1 a clock forming part of the self-triggering mechanism 25 decides at a certain moment, possibly after consultation of the update code originating from the server 61, that the terminal 1 should get an update of software. In both cases, the update of software, for example, as stored in the server-memory 66 is transmitted to the terminal 1, for example, together with an update signal informing the terminal 1 what to do with the update (for example to inform which old part is to be replaced).

When there is no connection between the terminal 1 and access means 5, the automatic-connection mechanism could be used, for example, under the control of the self-triggering mechanism 25, for automatically making a data connection for receiving the new information, etc.

According to a very advantageous embodiment, a first self-triggering mechanism (in the form of hardware and/or software) is located somewhere inside the access means 5, which first self-triggering mechanism results in the transmission of software to the terminal 1, which software, after being stored inside the terminal 1, will function as a second self-triggering mechanism by investigating, for example, all software stored inside the terminal 1 and deciding which software is to be replaced and then taking care of the replacement.

With the system disclosed in FIG. 1, the user at terminal 1 can get an overview of all messages of different types waiting for him, such as telephone messages, facsimile messages and data messages. To realize this, there is a coupling between, for example, a network-memory 43 and a server-memory 66, which coupling is made either via a communication link 4, an access point 51, a data connection 73, data-interface 62 and a bus 74, or via a separate connection not shown in the drawing figures. In case the overview should be present in the server-memory 66, the network-memory 43 must send information to the server 61, and in case the overview should be present in network-memory 43, server-memory 66 must send information to the telecommunication network 3. In both cases, the sending of the information could be done by using self-triggering mechanisms and/or automatic-connection mechanisms as described before.

When, for example, terminal-memory 13 comprises a server code defining an address of the serve 61 (and possibly an access code defining an address of access point 51), and comprises, for example, an overview code defining that an overview of all messages is required, a user of the terminal 1 may get this overview in a very user friendly way, by, for example, pressing only one key or typing a short command via at least one of both keyboards 19 and 20, after which terminal 1 is connected with the server 61, and the server-memory 66 transmits the overview to the terminal 1 for, for example, displaying this overview via a display 17.

Instead of the user taking initiative, it is also possible that, in case, for example, the server 61 receives new information to be stored in the server-memory 66, such as information with respect to telephone/facsimile messages stored in network-memory 43 or data messages to be stored in server-memory 66, then either a comparator forming part of the self-triggering mechanism 85 compares a first and second code belonging to the new information with a first and second code belonging to the terminal 1 and, for example, stored in server-memory 66 (which first code, for example, indicates that the new information is destined for the terminal 1, and which second code, for example, indicates that the terminal 1 has already or not yet been informed with respect to the new information), and in case of respective equality and inequality decides that the terminal 1 should be informed, or a clock forming part of the self-triggering mechanism 85 decides at a certain moment, possibly after consultation of the codes belonging to the terminal 1 and stored in the server-memory 66, that the terminal 1 should be informed. In both cases, an indication signal is generated by generation means 86 forming part of the processor 63, which generation signal comprises, for example, an address or telephone number of the terminal 1 (a terminal code). This indication signal is supplied to the telecommunication network 3 via a bus 74, data-interface 62, a data-connection 73, an access point 51 and a communication link 4. The telecommunication network 3 then transmits this indication signal to the terminal 1, in the case of the terminal 1 being an analog terminal via calling line identification (after a first ringing signal of a telephone call, but before a possible second ringing signal), and in case the terminal 1 is an ISDN terminal, via the D-channel. The terminal 1 comprises receiving means 23 forming part of the processor 12, which receiving means 23 receive (a part of) the indication signal via a communication link 2, a terminal-interface 11 and a bus 31, after which the indication signal is displayed via a display 17, thereby informing the user of the arrival in the server of new information. Of course, the terminal 1 could further be provided with an automatic-connection mechanism which, in response to the receival of the indication signal, automatically makes a data connection for receiving the new information, which is then stored into terminal-memory 13.

The system disclosed in FIG. 1 is further capable of dealing with the terminal 1 being connected to a printer 6 via a connection 7. The processor 63 in the server 61 is, for example, provided with conversion means 64 for converting data to be printed into printer data, with receiving means 88 for receiving an order code originating from the terminal 1 and indicating which data is to be converted, and with generation means 89 for generating a printer code defining an address of the printer 6. In the terminal 1, the processor 12 is, for example, provided with generation means 26 for generating the order code destined for the server 61, and with receiving means 27 for receiving the printer code originating from the server 61. Usually, a user using the terminal 1 will decide when data has to be printed. Compared to a personal computer, which has sufficient memory capacity and therefore is capable of converting data to be printed into printer data by using a software printer driver, the terminal 1 has a predefined size and price, and therefore less memory capacity. To prevent such a software printer driver from occupying too much of the terminal 1, conversion means 64, which, for example, comprise such a software driver, are located in the server 61. The user orders the terminal 1 via at least one of the keyboards 19 and 20, to print certain data, resulting in generation means 26 generating the order code, which via a bus 31, terminal-interface 11, a communication link 2, a network 3, a communication link 4, an access point 51, a data connection 73, data-interface 62 and a bus 74 is sent to the processor 63, in which receiving means 88 receive the order code and control server-memory 66 and conversion means 64 in such a way that the certain data is converted into printer data. The printer data is then sent back to the terminal 1 via a bus 74, data-interface 62, a data connection 73, an access point 51, a communication link 4, a network 3 and a communication link 2. In the terminal 1, the printer data is transmitted from terminal-interface 11 via a bus 31 to printer-interface 15, and then supplied via a connection 7 to the printer 6. So, the printer-interface does not have to comprise the software printer driver, but will generally comprise only a hardware printer driver.

In the terminal 1, the terminal-interface 11, a bus 31 and printer-interface 15 together form switching means for switching the printer data without passing the processor 12. For example, the printer code to be generated by generation means 89 and, for example, to be sent from the server 61 to the terminal 1 just before the printer data is sent, could be used to inform the processor 12 of the need for a transparent mode on behalf of the printer data. The order code generally could comprise the identity and/or address and/or type and/or trademark of the printer 6, to prevent that, for example, the server 61 is overloaded with information.

The access point 51 can, of course, entirely or partially be integrated with at least a telecommunication network 3 and/or a server 61. Further, inside the terminal 1, inside the access point 51 and inside the server 61, parts could be entirely or partially integrated.

Further, all embodiments and/or possibilities described above could of course be combined into new embodiments and/or possibilities having further inventive concepts.

What is claimed is:

1. A method for preparing a terminal to be used in a system for exchanging data between said terminal and access means via a telecommunication network, which terminal comprises:

a radio-interface to be coupled to said telecommunication network via a radio link, a processor coupled to said radio-interface, and a terminal-memory coupled to said processor, which access means comprise:

at least one access point to be coupled to said telecommunication network, and at least one server to be coupled to said access point via a data connection, characterized in that the method comprises the steps of:

selecting at least one access code out of many access codes defining addresses of access points, storing at least one selected access code into said terminal-memory, which is a non-mechanical memory, selecting at least one server code out of many server codes defining addresses of servers, storing at least one selected server code into said non-mechanical terminal-memory, and storing at least one user-dependent code into said non-mechanical terminal-memory for allowing a user to get his/her own screen layout, with said access means comprising a configuration memory for storing configuration parameters for, in response to said user-dependent code, configuring data such that said user gets said own screen layout.

2. A method according to claim 1, characterized in that the non-mechanical terminal-memory comprises a card reader and a card.

3. A method according to claim 2, characterized in that said card comprises at least user-dependent information.

4. A method according to claim 1, characterized in that the non-mechanical terminal-memory comprises a card reader and a card.

5. A system for exchanging data between a terminal and access means via a telecommunication network, which terminal comprises:

a radio-interface to be coupled to said telecommunication network, a processor coupled to said radio-interface, and a terminal-memory coupled to said processor, which access means comprise:

at least one access point to be coupled to said telecommunication network, and at least one server to be coupled to said access point via a data connection, characterized in that the terminal-memory is a non-mechanical memory comprising at least one access code which has been selected out of many access codes defining addresses of access points; at least one server code which has been selected out of many server codes defining addresses of servers, and at least one user-dependent code for allowing a user to get his/her own screen layout, with said access means comprising a configuration memory for storing configuration parameters for, in response to said user-dependent code, configuring data such that said user gets said own screen layout.

6. A system according to claim 5, characterized in that the non-mechanical terminal-memory comprises a card reader and a card.

7. A system according to claim 6, characterized in that the system comprises generation means for generating a challenge signal, with said card comprising a key signal and calculation means for calculating a response signal in response to said challenge signal, and with said access means comprising judging means for judging said calculated response signal.

8. A system according to claim 7, characterized in that the card comprises receiving means for receiving a PIN signal and for, in the case of said PIN signal being correct or not, activating or deactivating said calculation means.

9. A terminal according to claim 8, characterized in that the non-mechanical terminal-memory comprises a card reader and a card.

10. A system according to claim 6, characterized in that said card comprises at least user dependent information.

11. A system according to claim 5, characterized in that the non-mechanical terminal-memory comprises a card reader and a card.

12. A terminal for exchanging data with access means via a telecommunication network, which terminal comprises:

a radio-interface to be coupled to said telecommunication network via a radio link, a processor coupled to said radio-interface, and a terminal-memory coupled to said processor, which access means comprise:

at least one access point to be coupled to said telecommunication network, and at least one server to be coupled to said access point via a data connection, characterized in that the terminal-memory is a non-mechanical memory comprising at least one access code which has been selected out of many access codes defining addresses of access points; at least one server code which has been selected out of many server codes defining addresses of servers, and at least one user-dependent code for allowing a user to get his/her own screen layout, with said access means comprising a configuration memory for storing configuration parameters for, in response to said user-dependent code, configuring data such that said user gets said own screen layout.

13. The terminal according to claim 12, characterized in that the non-mechanical terminal-memory comprises a card reader and a card.

14. A terminal according to claim 13, characterized in that said card comprises at least user-dependent information.

15. A terminal according to claim 13, characterized in that said card comprises a key signal and calculation means for calculating a response signal in response to a challenge signal.

16. A terminal according to claim 15, characterized in that the card comprises receiving means for receiving a PIN signal and for, in the case of said PIN signal being correct or not, activating or deactivating said calculation means.

* * * * *